(12) United States Patent
Yoo et al.

(10) Patent No.: US 10,861,362 B2
(45) Date of Patent: Dec. 8, 2020

(54) METHOD OF COMPENSATING FOR NON-UNIFORM LUMINANCE OF A DISPLAY PANEL AND DISPLAY DEVICE EMPLOYING THE SAME

(71) Applicant: Samsung Display Co., Ltd., Yongin-si (KR)

(72) Inventors: Hyunseuk Yoo, Seoul (KR); Wooseok Han, Hwaseong-si (KR); Hyungjin Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 131 days.

(21) Appl. No.: 16/173,419

(22) Filed: Oct. 29, 2018

(65) Prior Publication Data
US 2019/0139470 A1    May 9, 2019

(30) Foreign Application Priority Data
Nov. 6, 2017  (KR) ........................ 10-2017-0146986

(51) Int. Cl.
*G09G 3/20*   (2006.01)
*G09G 5/10*   (2006.01)
(Continued)

(52) U.S. Cl.
CPC ........... *G09G 3/006* (2013.01); *G02B 27/017* (2013.01); *G09G 3/20* (2013.01); *H04N 13/133* (2018.05);
(Continued)

(58) Field of Classification Search
CPC .. G09G 5/00; G09G 5/02; G09G 5/06; G09G 5/10; G09G 3/00; G09G 3/20; G09G 3/28;
(Continued)

(56) References Cited

U.S. PATENT DOCUMENTS

| 2009/0128670 A1* | 5/2009 | Noh ......................... H04N 9/73 348/241 |
| 2009/0167957 A1* | 7/2009 | Joo .......................... G09G 5/00 348/687 |

(Continued)

FOREIGN PATENT DOCUMENTS

KR    10-2015-0048394 A    5/2015

*Primary Examiner* — Chanh D Nguyen
*Assistant Examiner* — Nguyen H Truong
(74) *Attorney, Agent, or Firm* — Lewis Roca Rothgerber Christie LLP

(57) ABSTRACT

A method of compensating for non-uniform luminance of a display panel including first pixels in a center region and second pixels in a non-center region, the method including displaying a for-compensation image, generating a luminance image by capturing an image of an entire region of the display panel, extracting luminance values of the first pixels from the luminance image by analyzing the luminance image, calculating and storing compensation factors for the first pixels based on the luminance values thereof, calculating compensation factors for the second pixels by performing an interpolation between a reference compensation factor determined for an edge of the non-center region and compensation factors for edge pixels on an edge of the center region when a displaying operation is performed, and compensating image data using the compensation factors for the first pixels and the second pixels when the displaying operation is performed on the display panel.

18 Claims, 9 Drawing Sheets

(51) Int. Cl.
*G09G 3/00* (2006.01)
*H04N 13/344* (2018.01)
*H04N 13/133* (2018.01)
*G02B 27/01* (2006.01)

(52) U.S. Cl.
CPC ... *H04N 13/344* (2018.05); *G02B 2027/0118* (2013.01); *G02B 2027/0178* (2013.01); *G09G 2310/0232* (2013.01); *G09G 2320/029* (2013.01); *G09G 2320/0233* (2013.01); *G09G 2320/0285* (2013.01); *G09G 2360/16* (2013.01)

(58) Field of Classification Search
CPC ... G09G 3/32; G09G 3/34; G09G 3/36; G02B 27/01; G02B 27/22; G02B 27/64; H04N 9/64; H04N 9/73; H04N 5/232; H04N 5/235; H04N 5/57; H04N 5/21; H04N 5/341; H04N 5/228; H04N 5/217; H04N 5/335; H04N 17/00; H04N 17/04; G02F 1/133; G02F 1/1333; G02F 1/1339; G06K 9/00; G06K 9/40; G06K 9/46
See application file for complete search history.

(56) References Cited

U.S. PATENT DOCUMENTS

| | | | |
|---|---|---|---|
| 2015/0116387 A1 | 4/2015 | Jun et al. | |
| 2015/0145894 A1* | 5/2015 | Kim | G09G 3/3607 345/690 |
| 2018/0103245 A1 | 4/2018 | Yoo et al. | |
| 2018/0122282 A1* | 5/2018 | He | G09G 3/2088 |

* cited by examiner

METHOD OF COMPENSATING FOR NON-UNIFORM LUMINANCE OF A DISPLAY PANEL AND DISPLAY DEVICE EMPLOYING THE SAME

CROSS-REFERENCE TO RELATED APPLICATION

This application claims priority to, and the benefit of, Korean Patent Application No. 10-2017-0146986, filed on Nov. 6, 2017 in the Korean Intellectual Property Office (KIPO), the contents of which are incorporated herein in its entirety by reference.

BACKGROUND

1. Field

Embodiments relate to a method of compensating for non-uniform luminance (or luminance mura) of a display panel, and a display device employing the method.

2. Description of the Related Art

Generally, a display device includes a display panel including a plurality of pixels, and generally it is desired for different pixels to emit the same luminance each other in response to the same data signal. However, because deviation of characteristics of the pixels exists due to a manufacturing process variation of the display panel, one of the pixels may implement luminance that is different from that of another of the pixels in response to the same data signal, and thus non-uniform luminance of the display panel, which a viewer (or user) can observe (or recognize, perceive, etc.), may be caused.

Thus, a conventional non-uniform luminance compensation technique compensates for the non-uniform luminance of the display panel by capturing a for-compensation image displayed on the display panel using a camera device (e.g., a luminance measuring instrument), by extracting (or obtaining) luminance values (e.g., degrees of brightness) of the pixels from the for-compensation image, by calculating compensation factors for the pixels based on the luminance values of the pixels, by storing the compensation factors for the pixels in a memory device, and by compensating image data using the compensation factors for the pixels read from the memory device when an image is displayed on the display panel.

When the display device is a head mounted display (HMD) device, the viewer watches the image through one or more lenses. Thus, luminance mura in a center region of the display panel can be more easily observed as compared to luminance mura in a non-center region of the display panel. For this reason, the conventional non-uniform luminance compensation technique reduces a capacity of the memory device that stores the compensation factors for the pixels, and a burden for capturing (or photographing) an entire region of the display panel using the camera device (e.g., time increase, accuracy reduction due to a resolution difference between the display panel and the camera device, etc.) by performing non-uniform luminance compensation only on the center region of the display panel (e.g., the compensation factors are calculated and stored in the memory device only for the pixels located in the center region of the display panel).

In other words, the conventional non-uniform luminance compensation technique reduces the capacity and the burden by not performing the non-uniform luminance compensation on the non-center region of the display panel (e.g., the compensation factors are not calculated and stored in the memory device for the pixels located in the non-center region of the display panel). Hence, the conventional non-uniform luminance compensation technique is limited in that a boundary between the center region, on which the non-uniform luminance compensation is performed, and the non-center region, on which the non-uniform luminance compensation is not performed, can be observed when the non-uniform luminance of the display panel is relatively severe.

SUMMARY

Some embodiments provide a method of compensating for non-uniform luminance of a display panel that can prevent (or reduce) a boundary between a center region of the display panel and a non-center region of the display panel from being observed by performing non-uniform luminance compensation on both the center region of the display panel and the non-center region of the display panel while calculating and storing compensation factors only for pixels located in the center region of the display panel.

Some embodiments provide a display device that employs a method of compensating for the non-uniform luminance of the display panel.

According to an aspect of embodiments, a method of compensating for non-uniform luminance of a display panel that includes first pixels in a center region of the display panel and second pixels in a non-center region of the display panel is described, the method including displaying a for-compensation image on the display panel, generating a luminance image by capturing an image of an entire region of the display panel, extracting luminance values of the first pixels from the luminance image by analyzing the luminance image, calculating and storing compensation factors for the first pixels based on the luminance values of the first pixels, calculating compensation factors for the second pixels by performing an interpolation between a reference compensation factor determined for an edge of the non-center region and compensation factors for edge pixels among the first pixels on an edge of the center region when a displaying operation is performed on the display panel, and compensating image data using the compensation factors for the first pixels and the compensation factors for the second pixels when the displaying operation is performed on the display panel.

The reference compensation factor may be set to be 1.

The interpolation may be a linear interpolation.

The edge of the center region may have a circle shape or an ellipse shape.

The interpolation may be performed using a first point on the edge of the center region and a second point at which a perpendicular line, which is perpendicular to a tangent line that is tangential to the edge of the center region and passes through the first point, meets the edge of the non-center region.

The edge of the center region may have a tetragon shape.

The non-center region may include a first non-center region that is covered by perpendicular lines, which are perpendicular to an edge of the center region and respectively pass through points on the edge of the center region, and a second non-center region that is not covered by the perpendicular lines, and the interpolation may include a first interpolation that is performed on the first non-center region and a second interpolation that is performed on the second non-center region.

The first interpolation may be performed using a first point on the edge of the center region and a second point at which a first perpendicular line of the perpendicular lines that passes through the first point meets the edge of the non-center region.

The second interpolation may be performed using a third point on the first perpendicular line and a fourth point at which a second perpendicular line, which is perpendicular to the first perpendicular line and passes through the third point, meets the edge of the non-center region.

According to another aspect of embodiments, a method of compensating for non-uniform luminance of a display panel that includes first pixels in a center region of the display panel and second pixels in a non-center region of the display panel is described, the method including displaying a for-compensation image on the display panel, generating a luminance image by capturing an image of the center region, extracting luminance values of the first pixels from the luminance image by analyzing the luminance image, calculating and storing compensation factors for the first pixels based on the luminance values of the first pixels, calculating compensation factors for the second pixels by performing an interpolation between a reference compensation factor determined for an edge of the non-center region and compensation factors for edge pixels on an edge of the center region among the first pixels when a displaying operation is performed on the display panel, and compensating image data using the compensation factors for the first pixels and the compensation factors for the second pixels when the displaying operation is performed on the display panel.

The reference compensation factor may be set to be 1.

The interpolation may be a linear interpolation.

The edge of the center region may have a circle shape or an ellipse shape.

The interpolation may be performed using a first point on the edge of the center region and a second point at which a perpendicular line, which is perpendicular to a tangent line that is tangential to the edge and passes through the first point, meets the edge of the non-center region.

The edge of the center region may have a tetragon shape.

The non-center region may include a first non-center region that is covered by perpendicular lines, which are perpendicular to the edge of the center region and pass through respective points on the edge of the center region, and a second non-center region that is not covered by the perpendicular lines, and the interpolation may include a first interpolation that is performed on the first non-center region and a second interpolation that is performed on the second non-center region.

The first interpolation may be performed using a first point on the edge of the center region and a second point at which a first perpendicular line of the perpendicular lines, which passes through the first point, meets the edge of the non-center region.

The second interpolation may be performed using a third point on the first perpendicular line and a fourth point at which a second perpendicular line, which is perpendicular to the first perpendicular line and passes through the third point, meets the edge of the non-center region.

According to an aspect of embodiments, a display device may include a display panel including first pixels in a center region of the display panel and second pixels in a non-center region of the display panel, a display panel driving circuit configured to drive the display panel, and a non-uniform luminance compensating circuit configured to store compensation factors for the first pixels, to calculate compensation factors for the second pixels by performing an interpolation between a reference compensation factor determined for an edge of the non-center region and compensation factors for edge pixels on an edge of the center region among the first pixels when a displaying operation is performed on the display panel, and to compensate image data using the compensation factors for the first pixels and the compensation factors for the second pixels when the displaying operation is performed on the display panel.

The non-uniform luminance compensating circuit may be implemented in the display panel driving circuit.

Therefore, a method of compensating for non-uniform luminance of a display panel according to embodiments may effectively compensate for the non-uniform luminance of the display panel, which includes first pixels located in a center region and second pixels located in a non-center region, by performing the non-uniform luminance compensation on both the center region of the display panel and the non-center region of the display panel, while calculating and storing compensation factors only for the first pixels located in the center region of the display panel. For example, the method of compensating for the non-uniform luminance of the display panel may prevent a boundary between the center region and the non-center region from being observed by displaying a for-compensation image on the display panel, by generating a luminance image by capturing only the center region of the display panel or an entire region of the display panel, by extracting luminance values of the first pixels from the luminance image by analyzing the luminance image, by calculating and storing compensation factors for the first pixels based on the luminance values of the first pixels, by calculating compensation factors for the second pixels by performing an interpolation between a reference compensation factor determined (or set) for an edge (or outline, border, etc.) of the non-center region and the compensation factors for edge pixels located on an edge of the center region among the first pixels when a displaying operation is performed on the display panel, and by compensating image data using the compensation factors for the first pixels and the compensation factors for the second pixels when the displaying operation is performed on the display panel.

In addition, a display device according to embodiments may provide a high-quality image to a viewer by employing the method of compensating for the non-uniform luminance of the display panel.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
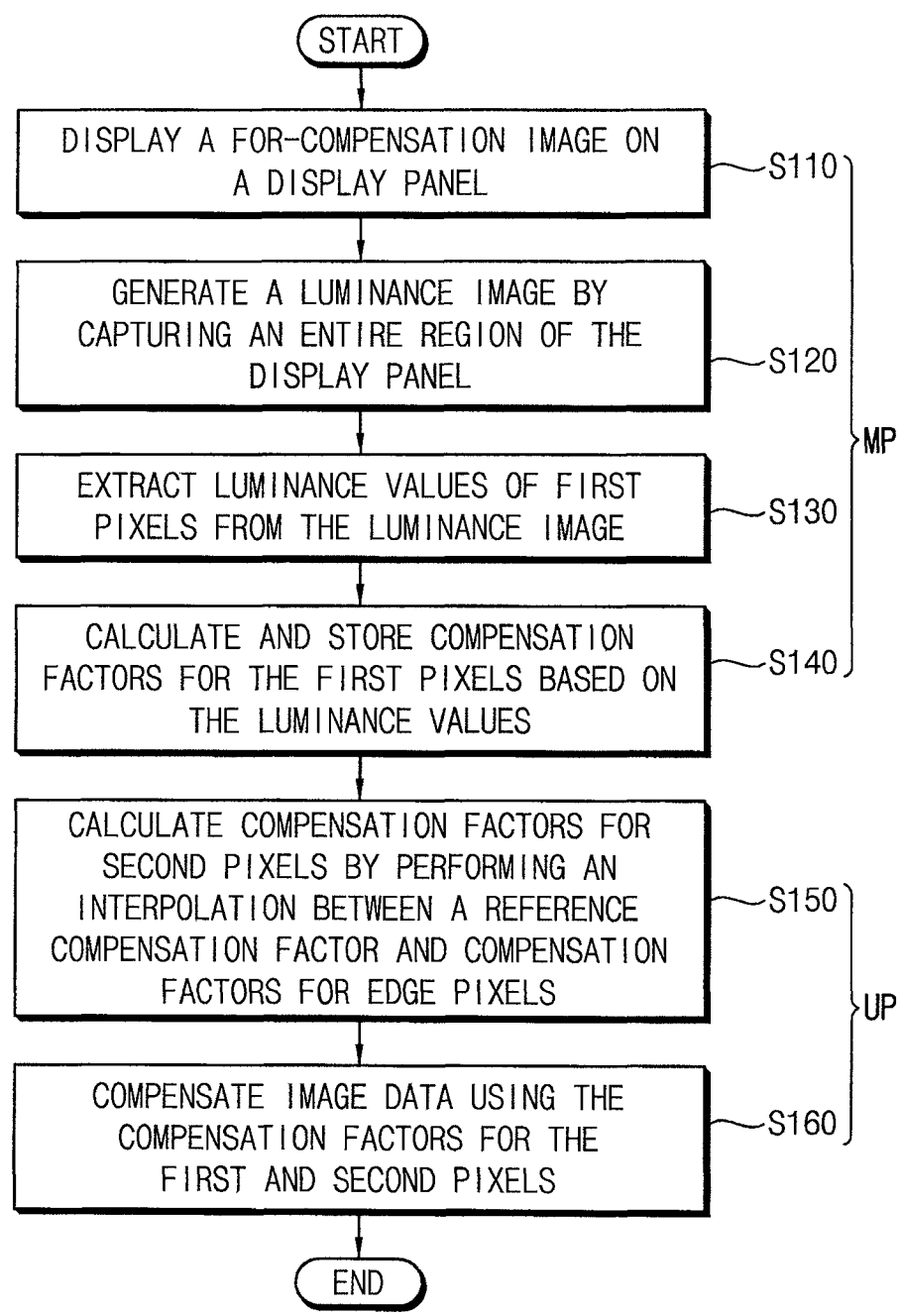
FIG. 1 is a flowchart illustrating a method of compensating for non-uniform luminance of a display panel according to embodiments.

Hereinafter, embodiments of the present inventive concept will be explained in detail with reference to the accompanying drawings.

Features of the inventive concept and methods of accomplishing the same may be understood more readily by reference to the following detailed description of embodiments and the accompanying drawings. Hereinafter, embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
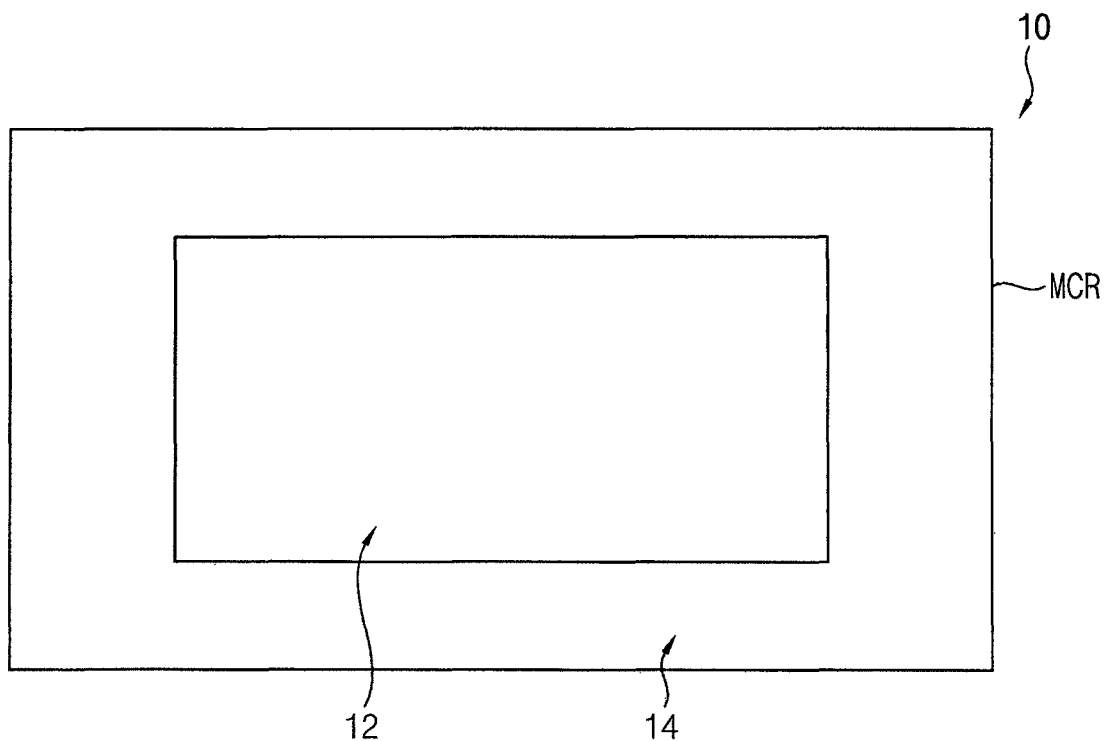
FIG. 2 is a diagram for describing the method of FIG. 1.
Figure 3:
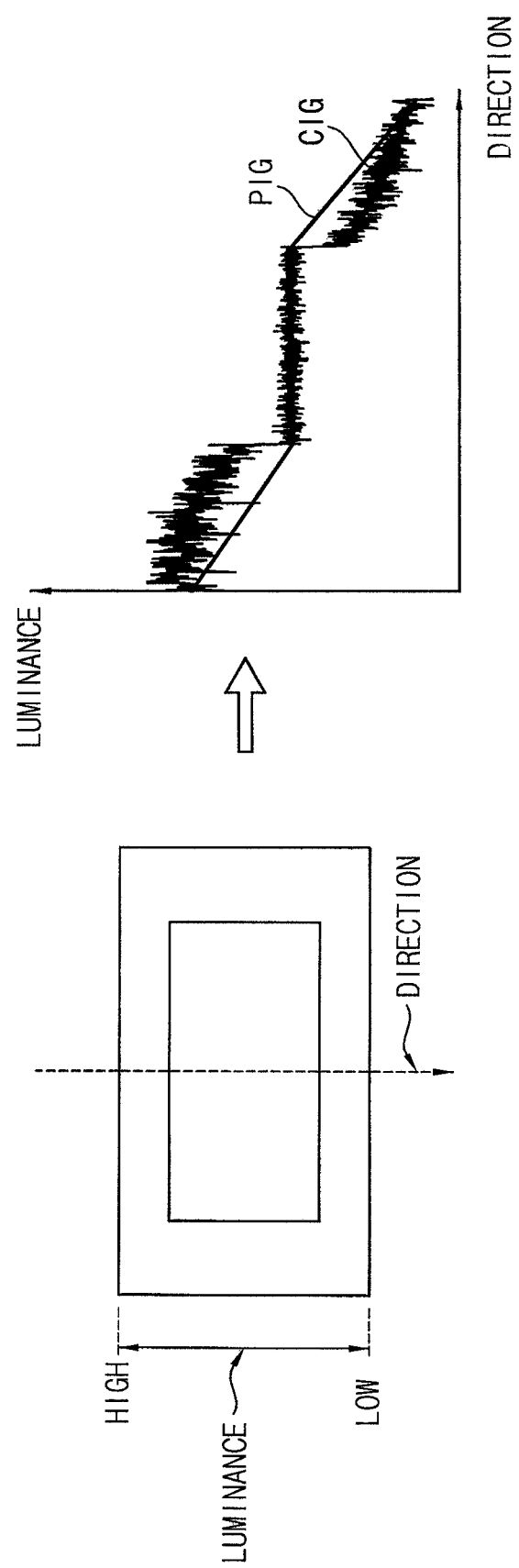
FIG. 3 is a graph illustrating an example in which the method of FIG. 1 prevents (or reduces) a boundary between a center region and a non-center region of a display panel from being observed.

FIG. 1 is a flowchart illustrating a method of compensating for non-uniform luminance of a display panel according to embodiments, FIG. 2 is a diagram for describing the method of FIG. 1, and FIG. 3 is a graph illustrating an example in which the method of FIG. 1 prevents (or reduces) a boundary between a center region and a non-center region of a display panel from being observed.

Referring to FIGS. 1 to 3, the method of FIG. 1 may compensate for the non-uniform luminance of the display panel 10, which includes first pixels located in a center region 12 and second pixels located in a non-center region 14. For this operation, the method of FIG. 1 may display a for-compensation image on the display panel 10 (S110), may generate a luminance image by capturing (or photographing) an entire region 12 and 14 of the display panel 10 (S120), may extract (or obtain) luminance values of the first pixels from the luminance image by analyzing the luminance image (S130), may calculate and store compensation factors for the first pixels based on the luminance values of the first pixels (S140), may calculate compensation factors for the second pixels by performing an interpolation between a reference compensation factor determined (or set) for an edge (e.g., an exterior edge) of the non-center region 14 and compensation factors for edge pixels located on an edge of the center region 12 among the first pixels (S150) when a displaying operation is performed on the display panel 10, and may compensate image data using the compensation factors for the first pixels and the compensation factors for the second pixels (S160) when the displaying operation is performed on the display panel 10.

Generally, a display device includes a display panel including a plurality of pixels, and different pixels should implement the same luminance as others in response to the same data signal. However, because deviation of characteristics of the pixels exists due to a manufacturing process variation of the display panel, one of the pixels may implement luminance that is different from that of another of the pixels in response to the same data signal, and thus non-uniform luminance of the display panel that a viewer (or user) can observe may be caused. Thus, a conventional non-uniform luminance compensation technique, which compensates for the non-uniform luminance of the display panel, may calculate compensation factors for the pixels of the display panel, may store the compensation factors for the pixels of the display panel in a memory device, and may compensate, when a displaying operation is performed on the display panel, non-uniform luminance using the compensation factors for the pixels read from the memory device. However, because the number of the pixels included in the display panel increases as resolution of the display panel increases, a burden for increasing capacity of the memory device to store all compensation factors for the pixels included in the display panel exists when compensating for the non-uniform luminance of the display panel having high resolution. Besides, it may be burdensome to capture an entire region of the display panel using the camera device to calculate all compensation factors for the pixels included in the display panel when compensating for the non-uniform luminance of the display panel having the high resolution.

For this reason, the conventional non-uniform luminance compensation technique reduces the burdens by performing non-uniform luminance compensation only on a center region of the display panel (e.g., by not performing the non-uniform luminance compensation on a non-center region of the display panel) when compensating a display device such as a head mounted display device, which includes a display panel in which luminance mura observability of the center region is relatively high while the luminance mura observability of the non-center region is relatively low. In this case, a boundary between the center region on which the non-uniform luminance compensation is performed and the non-center region on which the non-uniform luminance compensation is not performed can be observed when the non-uniform luminance of the display panel is relatively severe. Thus, a quality of an image provided to the viewer may be degraded.

To overcome these limits, the method of FIG. 1 may perform the non-uniform luminance compensation on the non-center region 14 of the display panel 10 as well as on the center region 12 of the display panel 10 while calculating and storing the compensation factors only for the first pixels located in the center region 12 of the display panel 10. Thus, the method of FIG. 1 may prevent (or reduce) the boundary between the center region 12 and the non-center region 14 of the display panel 10 from being observed as well as reduce the burdens.

For example, the method of FIG. 1 may include S110, S120, S130, and S140 performed in a manufacturing phase MP of the display panel 10 along with S150 and S160 performed in a driving phase UP of the display panel 10. First, the method of FIG. 1 may display the for-compensation image on the display panel 10 (S110). For example, the method of FIG. 1 may display the for-compensation image having a single grayscale on the display panel 10 by providing image data for implementing a given grayscale (or luminance) to the display panel 10. When the for-compensation image is displayed on the display panel 10, the method of FIG. 1 may generate the luminance image by capturing the entire region 12 and 14 of the display panel 10 (S120). For example, the method of FIG. 1 may use the camera device (e.g., a luminance measuring instrument) when generating the luminance image by capturing the entire region 12 and 14 of the display panel 10. Here, a capturing (or photographing) region MCR of the camera device may be the entire region 12 and 14 of the display panel 10. In addition, the luminance image may correspond to the for-compensation image displayed on the entire region 12 and 14 of the display panel 10.

Subsequently, the method of FIG. 1 may extract the luminance values (e.g., degrees of brightness) of the first pixels located in the center region 12 of the display panel 10 from the luminance image by analyzing the luminance image (S130). Although the capturing region MCR of the camera device is the entire region 12 and 14 of the display panel 10, and although the luminance image corresponds to the for-compensation image displayed on the entire region 12 and 14 of the display panel 10, only the luminance values of the first pixels located in the center region 12 of the display panel 10 are extracted in the present embodiment. Thus, only the compensation factors for the first pixels located in the center region 12 of the display panel 10 may be calculated and stored in the memory device. As a result, the method of FIG. 1 may reduce a time because the method of FIG. 1 does not calculate the compensation factors for the second pixels located in the non-center region 14 of the display panel 10. In addition, the method of FIG. 1 may reduce an amount of used capacity of the memory device because the method of FIG. 1 does not store the compensation factors for the second pixels located in the non-center region 14 of the display panel 10.

Next, the method of FIG. 1 may calculate and store the compensation factors for the first pixels located in the center region 12 of the display panel 10 based on the luminance values of the first pixels extracted from the luminance image (S140). For example, when the for-compensation image is displayed on the display panel 10 for a luminance value of a normal pixel to be A, a compensation factor for a first pixel may be calculated as NB if a luminance value of the first pixel extracted from the luminance image is B. Thus, when the first pixel is the normal pixel, the compensation factor for the first pixel may be 1 (e.g., A/A) because the luminance value of the first pixel extracted from the luminance image is A. However, a method of calculating the compensation factors for the first pixels is not limited thereto. In some embodiments, the method of FIG. 1 may generate two or more luminance images by sequentially displaying two or more for-compensation images (e.g., a low grayscale for-compensation image and a high grayscale for-compensation image) on the display panel 10, and by capturing the two or more for-compensation images, respectively. In this case, because the luminance values of the first pixels are extracted from the two or more luminance images (e.g., the luminance values of the first pixels are extracted two or more times), the compensation factors for the first pixels may be more accurately calculated.

Subsequently, the method of FIG. 1 may calculate the compensation factors for the second pixels located in the non-center region 14 of the display panel 10 by performing the interpolation between the reference compensation factor determined for the edge of the non-center region 14 and the compensation factors for the edge pixels among the first pixels located on the edge of the center region 12 (S150) when the displaying operation is performed on the display panel 10. In an embodiment, the reference compensation factor for the edge of the non-center region 14 of the display panel 10 may be set (or determined) to be 1. In other words, the compensation factors for edge pixels among the second pixels located on the edge of the non-center region 14 of the display panel 10 may be set to be 1. Thus, the compensation factors for the second pixels located in the non-center region 14 of the display panel 10 may be calculated by performing the interpolation between the compensation factors for the edge pixels located on the edge of the center region 12 among the first pixels and the compensation factors (e.g., the reference compensation factor) for the edge pixels located on the edge of the non-center region 14 among the second pixels. Because the luminance image generated at S120 corresponds to the for-compensation image displayed on the entire region 12 and 14 of the display panel 10, in some embodiments, the compensation factors for the edge pixels located on the edge of the non-center region 14 among the second pixels may be calculated and stored, and then may be used instead of the reference compensation factor when the interpolation is performed.

In embodiments, the interpolation may be a linear interpolation. However, the present inventive concept does not exclude other embodiments in which the interpolation is a non-linear interpolation. In an embodiment, the edge of the center region 12 of the display panel 10 may have a circle shape or an ellipse shape. In this case, the method of FIG.

1 may perform the interpolation by using a first point on the edge of the center region 12 and a second point on the edge of the non-center region 14, where a perpendicular line of, or passing through, the first point on the edge of the center region 12 meets (or intersects) the second point on the edge on the non-center region 14 (e.g., the perpendicular line being perpendicular to an edge of the center region 12). The interpolation will be described in detail with reference to FIG. 4.

In another embodiment, as illustrated in FIG. 2, the edge of the center region 12 may have a tetragon shape. Here, the non-center region 14 may include a first non-center region that is covered by perpendicular lines of, or passing through, points on the edge of the center region 12 and a second non-center region that is not covered by the perpendicular lines of the points on the edge of the center region 12 (e.g., the perpendicular lines being lines that are perpendicular to one of the four sides of the edge of the center region 12). In this case, the method of FIG. 1 may perform a first interpolation on the first non-center region of the display panel 10 using the first point on the edge of the center region 12 and the second point on the edge of the non-center region 14, where a first perpendicular line of the first point on the edge of the center region 12 meets the second point on the edge of the non-center region 14. In addition, the method of FIG. 1 may perform a second interpolation on the second non-center region of the display panel 10 using a third point on the first perpendicular line and a fourth point on the edge of the non-center region 14, where a second perpendicular line of the third point on the first perpendicular line meets the fourth point on the edge of the non-center region 14. The first and second interpolations will be described in detail with reference to FIGS. 5A and 5B.

Next, the method of FIG. 1 may compensate the image data using the compensation factors for the first pixels and the compensation factors for the second pixels (S160) when the displaying operation is performed on the display panel 10. In other words, the method of FIG. 1 may perform the non-uniform luminance compensation on the non-center region 14 as well as the center region 12 while calculating and storing the compensation factors only for the first pixels located in the center region 12. As a result, as illustrated in FIG. 3, when an image in which luminance decreases from an upper part of the display panel 10 to a lower part of the display panel 10 is displayed, the luminance may not change sharply at boundaries BD1 and BD2 between the center region 12 and the non-center region 14 (e.g., indicated by PIG) because the non-uniform luminance compensation is performed on both the center region 12 and the non-center region 14. Thus, a viewer cannot perceive the boundaries BD1 and BD2 between the center region 12 and the non-center region 14.

On the other hand, because the non-uniform luminance compensation technique performs the non-uniform luminance compensation only on the center region 12, the luminance may change sharply at the boundaries BD1 and BD2 between the center region 12 and the non-center region 14 (e.g., indicated by CIG), and thus the viewer can perceive the boundaries BD1 and BD2 between the center region 12 and the non-center region 14.

As described above, the method of FIG. 1 may effectively compensate for the non-uniform luminance of the display panel 10 that includes the first pixels located in the center region 12 and the second pixels located in the non-center region 14 by performing the non-uniform luminance compensation on both the center region 12 and the non-center region 14 while calculating and storing the compensation factors only for the first pixels located in the center region 12. To this end, the method of FIG. 1 may display the for-compensation image on the display panel 10, may generate the luminance image by capturing the entire region 12 and 14 of the display panel 10, may extract the luminance values of the first pixels from the luminance image by analyzing the luminance image, may calculate and store the compensation factors for the first pixels based on the luminance values of the first pixels, may calculate the compensation factors for the second pixels by performing the interpolation between the reference compensation factor determined for the edge of the non-center region 14 and the compensation factors for the edge pixels located on the edge of the center region 12 among the first pixels when the displaying operation is performed on the display panel 10, and may compensate the image data using the compensation factors for the first pixels and the compensation factors for the second pixels when the displaying operation is performed on the display panel 10. As a result, the method of FIG. 1 may prevent (or reduce) the boundary between the center region 12 and the non-center region 14 from being observed.

Figure 4:
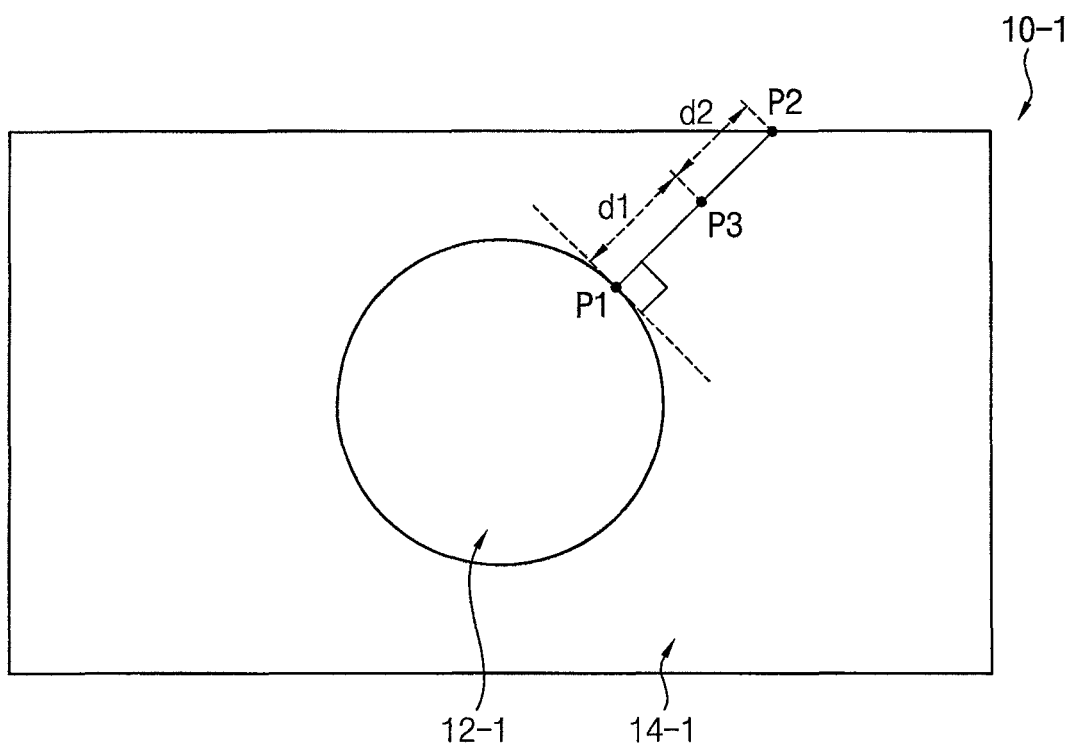
FIG. 4 is a diagram illustrating an example in which the method of FIG. 1 performs an interpolation when an edge of a center region of a display panel has a circle shape.

FIG. 4 is a diagram illustrating an example in which the method of FIG. 1 performs an interpolation when an edge of a center region of a display panel has a circle shape.

Referring to FIG. 4, the edge of the center region 12-1 may have a circle shape. In this case, the method of FIG. 1 may perform an interpolation using a first point P1 (e.g., referred to as an edge pixel) on the edge of the center region 12-1 and a second point P2 at which a perpendicular line of, or passing through, the first point P1 meets the edge of the non-center region 14-1 when a displaying operation is performed on the display panel 10-1. Here, the perpendicular line of the first point P1 indicates a line that is perpendicular to a tangent line of the first point P1 on the edge of the center region 12-1.

When the reference compensation factor for the edge of the non-center region 14-1 is set (or determined) to be 1, the compensation factor C2 for the second point P2 may be the reference compensation factor (e.g., 1). Thus, as illustrated in FIG. 4, when the compensation factor for the first point P1 is C1, when the third point P3 is apart from the first point P1 by a first distance d1 on the perpendicular line of the first point P1, and when the third point P3 is apart from the second point P2 by a second distance d2 on the perpendicular line of the first point P1, the compensation factor C3 for the third point P3 may be calculated using [Equation 1] below.

$$C3 = \frac{d2 \times C1 + d1 \times 1}{d1 + d2}, \qquad \text{[Equation 1]}$$

where C1 denotes the compensation factor for the first point P1, C2 (e.g., 1) denotes the compensation factor for the second point P2, C3 denotes the compensation factor for the third point P3, d1 denotes a distance between the third point P3 and the first point P1 on the perpendicular line passing through the first point P1, and d2 denotes a distance between the third point P3 and the second point P2 on the perpendicular line passing through the first point P1.

As described above, the method of FIG. 1 may calculate and store the compensation factors only for the first pixels located in the center region 12-1. Thus, the method of FIG. 1 may calculate the compensation factors for the second pixels located in the non-center region 14-1 by performing the interpolation between the reference compensation factor determined for the edge of the non-center region 14 and the compensation factors for the edge pixels among the first pixels located on the edge of the center region 12 when the displaying operation is performed on the display panel 10-1. As a result, the method of FIG. 1 may compensate the image data using the compensation factors for the first pixels and the compensation factors for the second pixels when the displaying operation is performed on the display panel 10-1, and thus may provide a high-quality image (e.g., a non-uniform luminance eliminated image) to a viewer.

Figure 5A:
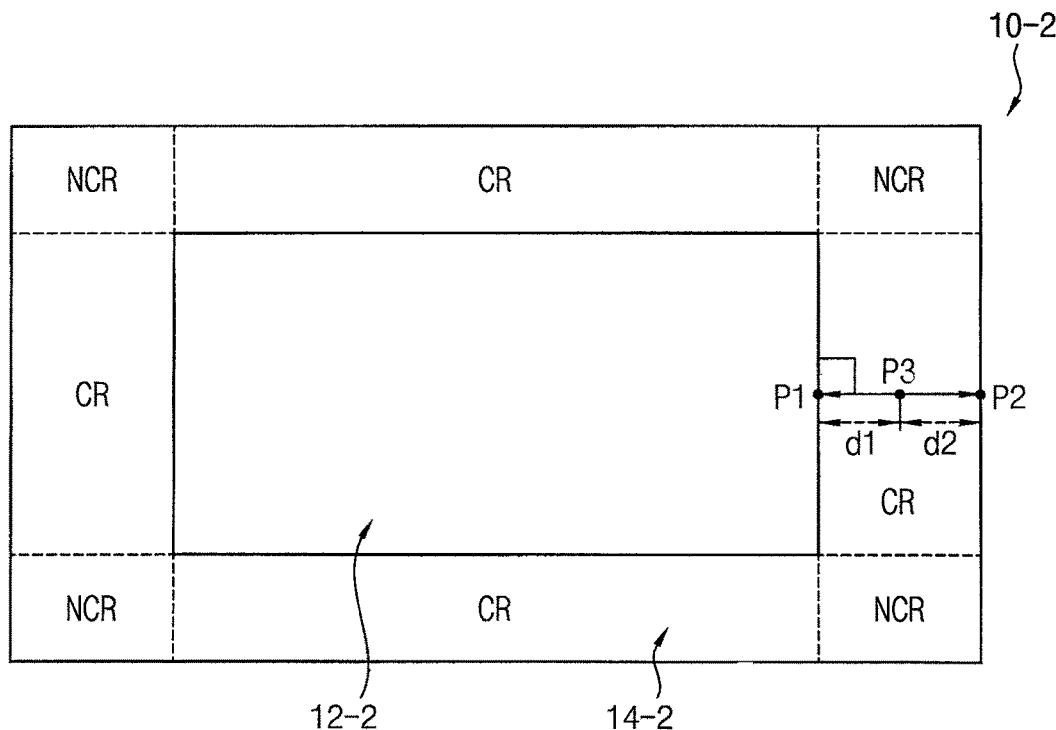
FIG. 5A is a diagram illustrating an example in which the method of FIG. 1 performs a first interpolation when an edge of a center region of a display panel has a tetragon shape.
Figure 5B:
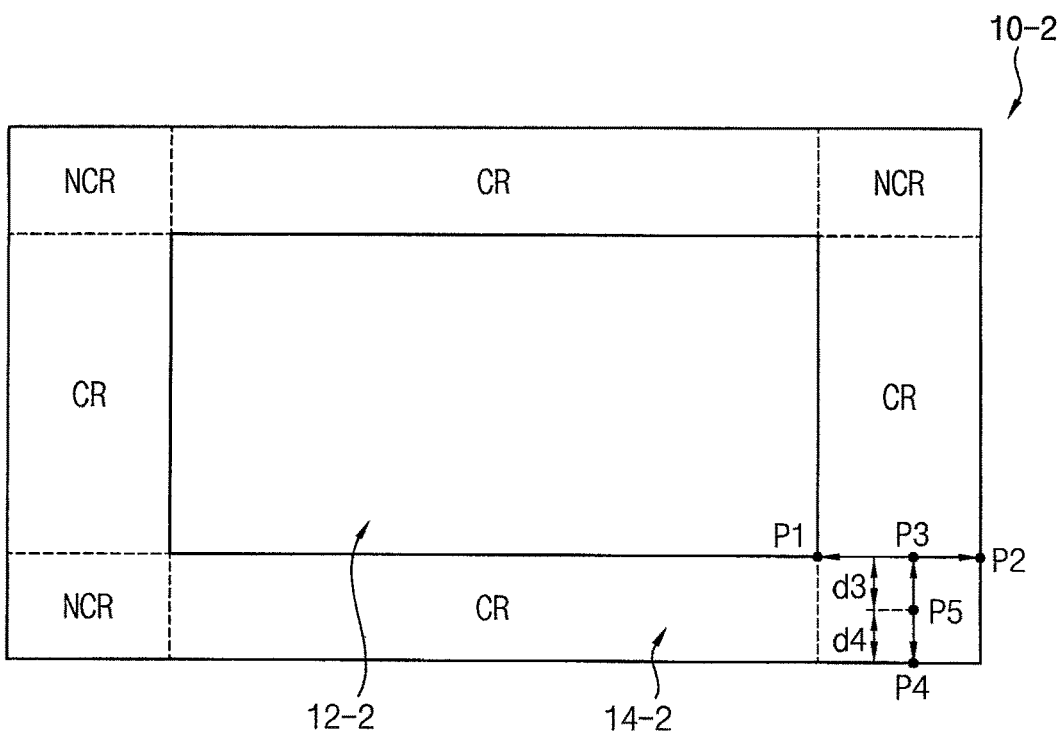
FIG. 5B is a diagram illustrating an example in which the method of FIG. 1 performs a second interpolation when an edge of a center region of a display panel has a tetragon shape.

FIG. 5A is a diagram illustrating an example in which the method of FIG. 1 performs a first interpolation when an edge of a center region of a display panel has a tetragon shape, and FIG. 5B is a diagram illustrating an example in which the method of FIG. 1 performs a second interpolation when an edge of a center region of a display panel has a tetragon shape.

Referring to FIGS. 5A and 5B, the edge of the center region 12-2 may have a tetragon shape. In this case, the non-center region 14-2 may include the first non-center region(s) CR that is covered by the perpendicular lines of points (e.g., edge pixels) on the edge of the center region 12-2 and the second non-center region(s) NCR that is not covered by the perpendicular lines of the points on the edge of the center region 12-2. Thus, the method of FIG. 1 may perform the first interpolation on the first non-center region CR of the display panel 10-2 and may perform the second interpolation on the second non-center region NCR of the display panel 10-2.

As illustrated in FIG. 5A, the method of FIG. 1 may perform the first interpolation on the first non-center region CR of the display panel 10-2. For example, the method of FIG. 1 may perform the first interpolation using a first point P1 on the edge of the center region 12-2 and a second point P2 at which a first perpendicular line of the first point P1 meets the edge of the non-center region 14-2 when a displaying operation is performed on the display panel 10-2. When the reference compensation factor for the edge of the non-center region 14-2 is set (or determined) to be 1, the compensation factor C2 for the second point P2 may be the reference compensation factor (e.g., 1). Thus, when the compensation factor for the first point P1 is C1, when the third point P3 is apart from the first point P1 by a first distance d1 on the first perpendicular line of the first point P1, and is apart from the second point P2 by a second distance d2 on the first perpendicular line of the first point P1, the compensation factor C3 for the third point P3 may be calculated using [Equation 2] below.

$$C3 = \frac{d2 \times C1 + d1 \times 1}{d1 + d2},$$ [Equation 2]

where C1 denotes the compensation factor for the first point P1, C2 (e.g., 1) denotes the compensation factor for the second point P2, C3 denotes the compensation factor for the third point P3, d1 denotes a distance between the third point P3 and the first point P1 on the first perpendicular line of the first point P1, and d2 denotes a distance between the third point P3 and the second point P2 on the first perpendicular line of the first point P1.

As illustrated in FIG. 5B, the method of FIG. 1 may perform the second interpolation on the second non-center region NCR of the display panel 10-2. For example, the method of FIG. 1 may calculate the compensation factor C3 for the third point P3 based on the first interpolation and then may perform the second interpolation using the third point P3 and the fourth point P4 at which a second perpendicular line of the third point P3 meets the edge of the non-center region 14-2 when the displaying operation is performed on the display panel 10-2 (e.g., the second perpendicular line may be parallel to one or more of the four edges defining the center region 12-2, and may be perpendicular to the first perpendicular line). For example, when the reference compensation factor for the edge of the non-center region 14-2 is set to be 1, the compensation factor C4 for the fourth point P4 may be the reference compensation factor (e.g., 1). Thus, when the compensation factor for the third point P3 is C3, when the fifth point P5 is apart from the third point P3 by a third distance d3 on the second perpendicular line of the third point P3, and when the fifth point P5 is apart from the fourth point P4 by a fourth distance d4 on the second perpendicular line of the third point P3, the compensation factor C5 for the fifth point P5 may be calculated using [Equation 3] below.

$$C5 = \frac{d4 \times C3 + d3 \times 1}{d3 + d4},$$ [Equation 3]

where C3 denotes the compensation factor for the third point P3, C4 (e.g., 1) denotes the compensation factor for the fourth point P4, C5 denotes the compensation factor for the fifth point P5, d3 denotes a distance between the fifth point P5 and the third point P3 on the second perpendicular line of the third point P3, and d4 denotes a distance between the fifth point P5 and the fourth point P4 on the second perpendicular line of the third point P3.

As described above, the method of FIG. 1 may calculate and store the compensation factors only for the first pixels located in the center region 12-2. Thus, the method of FIG. 1 may calculate the compensation factors for the second pixels located in the non-center region 14-2 by performing the interpolation between the reference compensation factor determined for the edge of the non-center region 14 and the compensation factors for the edge pixels located on the edge of the center region 12 among the first pixels when the displaying operation is performed on the display panel 10-2. As a result, the method of FIG. 1 may compensate the image data using the compensation factors for the first pixels and the compensation factors for the second pixels when the displaying operation is performed on the display panel 10-2, and thus may provide a high-quality image (e.g., a non-uniform luminance eliminated image) to a viewer.

Figure 6:
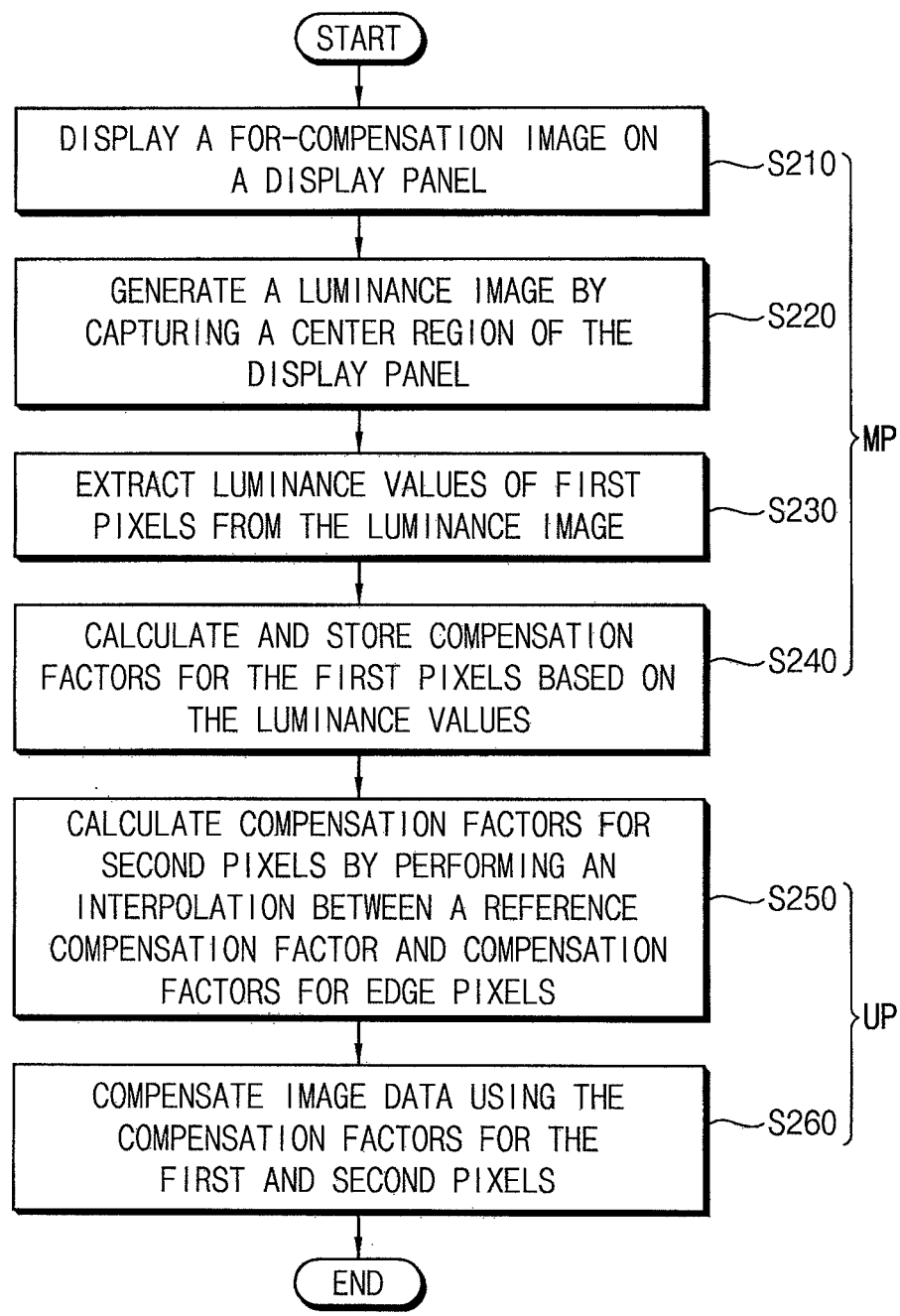
FIG. 6 is a flowchart illustrating a method of compensating for non-uniform luminance of a display panel according to embodiments.
Figure 7:
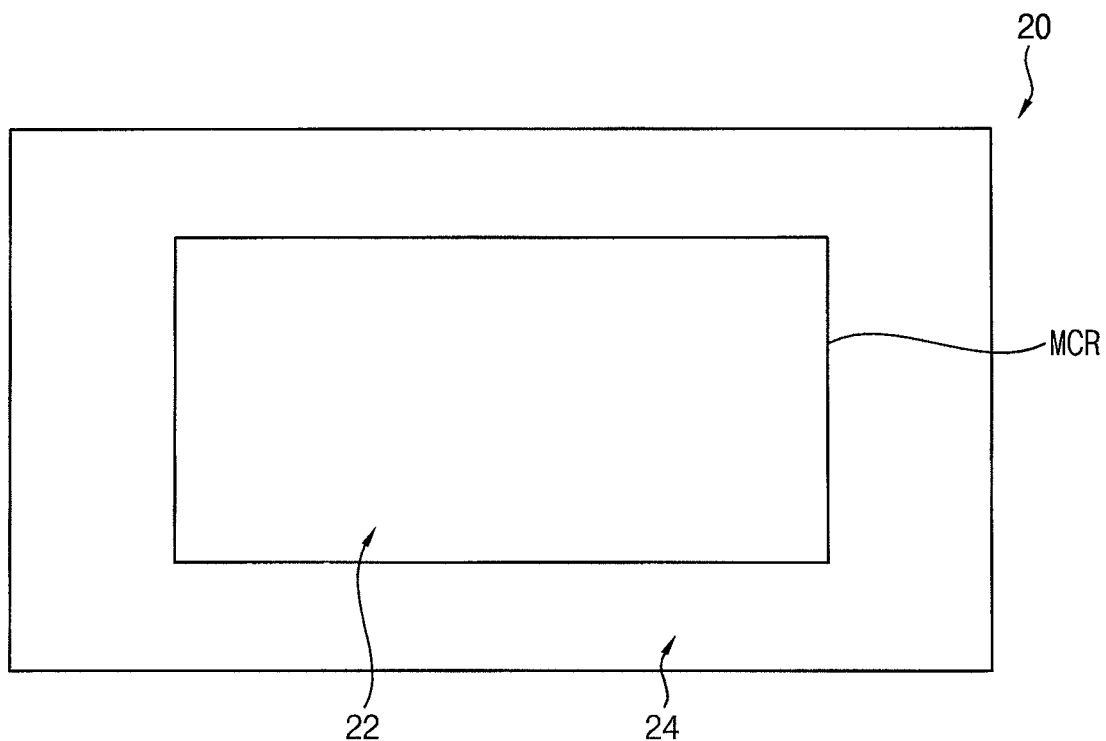
FIG. 7 is a diagram for describing the method of FIG. 6.

FIG. 6 is a flowchart illustrating a method of compensating for non-uniform luminance of a display panel according to embodiments, and FIG. 7 is a diagram for describing the method of FIG. 6.

Referring to FIGS. 6 and 7, the method of FIG. 6 may compensate for the non-uniform luminance of the display panel 20 that includes first pixels located in a center region 22 and second pixels located in a non-center region 24. For this operation, the method of FIG. 6 may display a for-compensation image on the display panel 20 (S210), may generate a luminance image by capturing the center region 22 of the display panel 20 (S220), may extract luminance values of the first pixels from the luminance image by analyzing the luminance image (S230), may calculate and store compensation factors for the first pixels based on the luminance values of the first pixels (S240), may calculate compensation factors for the second pixels by performing an interpolation between a reference compensation factor determined for an edge of the non-center region 24 and compensation factors for edge pixels located on an edge of the center region 22 among the first pixels (S250) when a displaying operation is performed on the display panel 20, and may compensate image data using the compensation factors for the first pixels and the compensation factors for the second pixels (S260) when the displaying operation is performed on the display panel 20. Here, except that the luminance image is generated by capturing only the center region 22 of the display panel 20 (e.g., not the entire region 22 and 24 of the display panel 20), the method of FIG. 6 may be substantially the same as the method of FIG. 1. Thus, in describing the method of FIG. 6, duplicated description will not be repeated.

Generally, when the for-compensation image displayed on the display panel 20 is captured by a camera device (e.g., a luminance measuring instrument), resolution of the camera device should be increased to achieve accuracy of the result as resolution of the display panel 20 is increased. For example, if the resolution of the camera device (e.g., the number of pixels included in the camera device) is lower than the resolution of the display panel 20 (e.g., the number of pixels included in the display panel 20), the accuracy of the result may be low when the entire region 22 and 24 of the display panel 20 is captured by the camera device. In addition, if the resolution of the camera device (e.g., the number of the pixels included in the camera device) is different from the resolution of the display panel 20 (e.g., the number of the pixels included in the display panel 20), a relatively severe moiré effect may be caused due to misalignment between a pixel arrangement of the display panel 20 and a pixel arrangement of the camera device. However, there is a limit of increasing the resolution of the camera device as the resolution of the display panel 20 increases. Thus, the method of FIG. 6 may reduce, prevent, or minimize accuracy reduction of the result by capturing only a portion of the entire region 22 and 24 of the display panel 20 (e.g., the center region 22 of the display panel 20) using the camera device having resolution that is lower than that of the display panel 20. Here, because the method of FIG. 6 calculates and stores the compensation factors only for the first pixels located in the center region 22 of the display panel 20, no problem may occur even though the method of FIG. 6 generates the luminance image by capturing only the center region 22 of the display panel 20.

As described above, the method of FIG. 6 may effectively compensate for the non-uniform luminance of the display panel 20 that includes the first pixels located in the center region 22 and the second pixels located in the non-center region 24 by performing the non-uniform luminance compensation on both the center region 22 and the non-center region 24 while calculating and storing the compensation factors only for the first pixels located in the center region 22. To this end, the method of FIG. 6 may display the for-compensation image on the display panel 20, may generate the luminance image by capturing only the center region 22, may extract the luminance values of the first pixels from the luminance image by analyzing the luminance image, may calculate and store the compensation factors for the first pixels based on the luminance values of the first pixels, may calculate the compensation factors for the second pixels by performing the interpolation between the reference compensation factor determined for the edge of the non-center region 24 and the compensation factors for the edge pixels located on the edge of the center region 22 among the first pixels when a displaying operation is performed on the display panel 20, and may compensate the image data using the compensation factors for the first pixels and the compensation factors for the second pixels when the displaying operation is performed on the display panel 20. As a result, the method of FIG. 6 may prevent (or reduce) the boundary between the center region 22 and the non-center region 24 from being observed.

Figure 8:
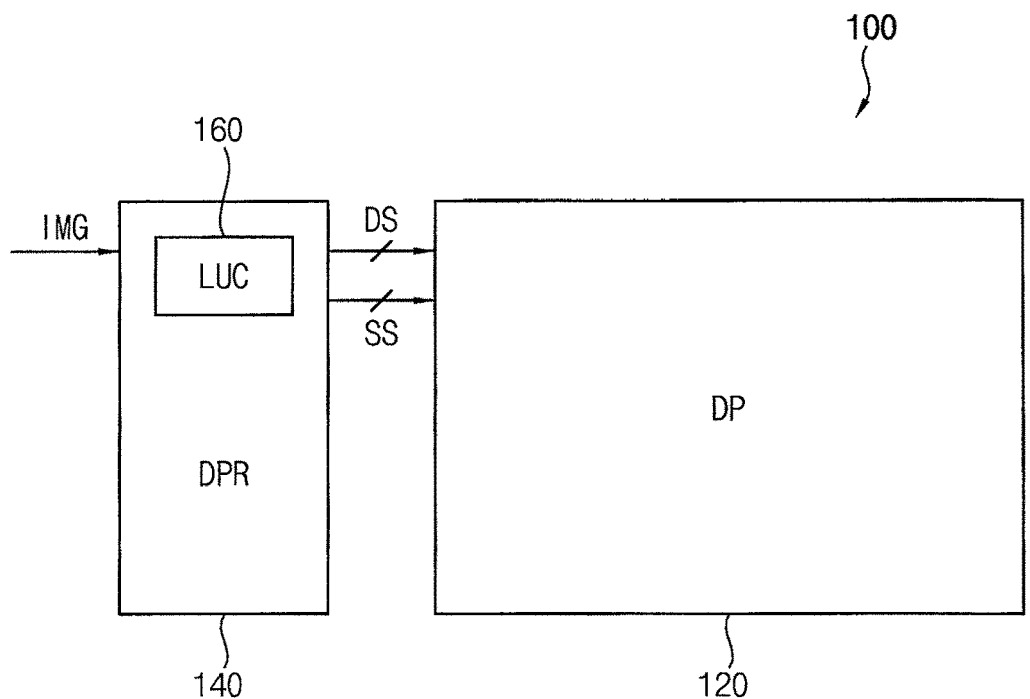
FIG. 8 is a block diagram illustrating a display device according to embodiments.

FIG. 8 is a block diagram illustrating a display device according to embodiments.

Referring to FIG. 8, the display device 100 may include a display panel 120, a display panel driving circuit 140, and a non-uniform luminance compensating circuit 160. Here, the display device 100 may be an organic light emitting display (OLED) device or a liquid crystal display (LCD) device. However, the display device 100 is not limited thereto.

The display panel 120 may include a plurality of pixels. The pixels may be classified (or divided) into first pixels located in a center region of the display panel 120 and second pixels located in a non-center region of the display panel 120. In the display panel 120, the pixels may be arranged in a matrix form. In an embodiment, an edge of the center region of the display panel 120 may have a circle shape or an ellipse shape. In another embodiment, the edge of the center region of the display panel 120 may have a tetragon shape.

The display panel driving circuit 140 may drive (or control) the display panel 120. In an embodiment, the display panel driving circuit 140 may include a scan driver, a data driver, and a timing controller. In this case, the display panel 120 may be connected to the scan driver via scan-lines and may be connected to the data driver via data-lines. The scan driver may provide a scan signal SS to the display panel 120 via the scan-lines. The data driver may provide a data signal DS to the display panel 120 via the data-lines. The timing controller may control the scan driver and the data driver. In some embodiments, when the display device 100 is the organic light emitting display device, the display panel driving circuit 140 may further include an emission controller. In this case, the display panel 120 may be connected to the emission controller via emission control-lines. The emission controller may provide an emission control signal to the display panel 120 via the emission control-lines. Because the above structure of the display panel driving circuit 140 is an example, components included in the display panel driving circuit 140 are not limited thereto.

The non-uniform luminance compensating circuit 160 may store compensation factors for the first pixels located in the center region of the display panel 120. In addition, the non-uniform luminance compensating circuit 160 may calculate compensation factors for the second pixels located in the non-center region of the display panel 120 by performing an interpolation between a reference compensation factor determined for an edge of the non-center region of the display panel 120 and compensation factors for edge pixels located on an edge of the central region of the display panel 120 among the first pixels located in the center region of the display panel 120 when a displaying operation is performed on the display panel 120. Thus, the non-uniform luminance compensating circuit 160 may compensate image data IMG using the compensation factors for the first pixels and the compensation factors for the second pixels when the displaying operation is performed on the display panel 120. In an embodiment, as illustrated in FIG. 8, the non-uniform luminance compensating circuit 160 may be implemented (or located) in the display panel driving circuit 140. For example, the non-uniform luminance compensating circuit 160 may be implemented in the timing controller of the display panel driving circuit 140 or in the data driver of the display panel driving circuit 140. In another embodiment, the non-uniform luminance compensating circuit 160 may be implemented externally to the display panel driving circuit 140 and may be connected to the display panel driving circuit 140.

In embodiments, an operation of storing the compensation factors for the first pixels located in the center region of the display panel 120 into the non-uniform luminance compensating circuit 160 may be performed in a manufacturing process of the display panel 120. That is, the operation of storing the compensation factors for the first pixels may be performed by displaying a for-compensation image on the display panel 120, by generating a luminance image by capturing the center region of the display panel 120 or an entire region of the display panel 120 using a camera device, by extracting luminance values of the first pixels located in the center region of the display panel 120 from the luminance image after analyzing the luminance image, by calculating the compensation factors for the first pixels based on the luminance values of the first pixels located in the center region of the display panel 120, and by storing the compensation factors for the first pixels in a memory device.

In other words, the non-uniform luminance compensating circuit 160 may include the memory device that stores the compensation factors for the first pixels located in the center region of the display panel 120. Because the above operation is described with reference to FIGS. 1 to 7, duplicated description related thereto will not be repeated. In brief, the display device 100 may accurately compensate for the non-uniform luminance of the display panel 120 by including the non-uniform luminance compensating circuit 160, and thus may provide a viewer with a high-quality image (e.g., an image generated by compensating for the non-uniform luminance of the display panel 120).

Figure 9:
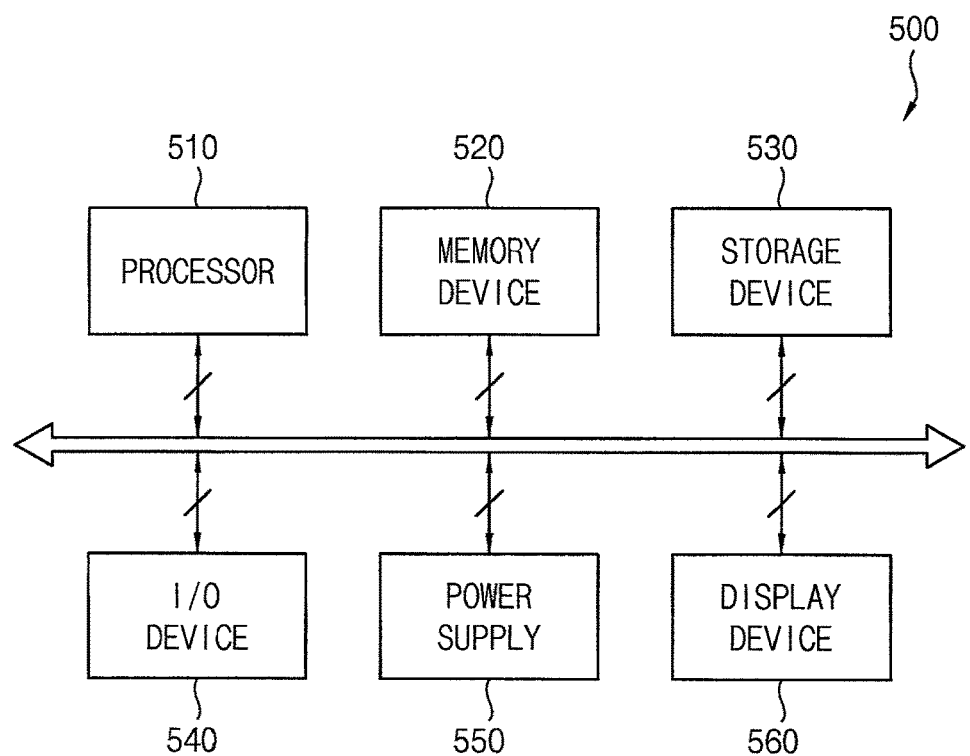
FIG. 9 is a block diagram illustrating an electronic device according to embodiments.
Figure 10:
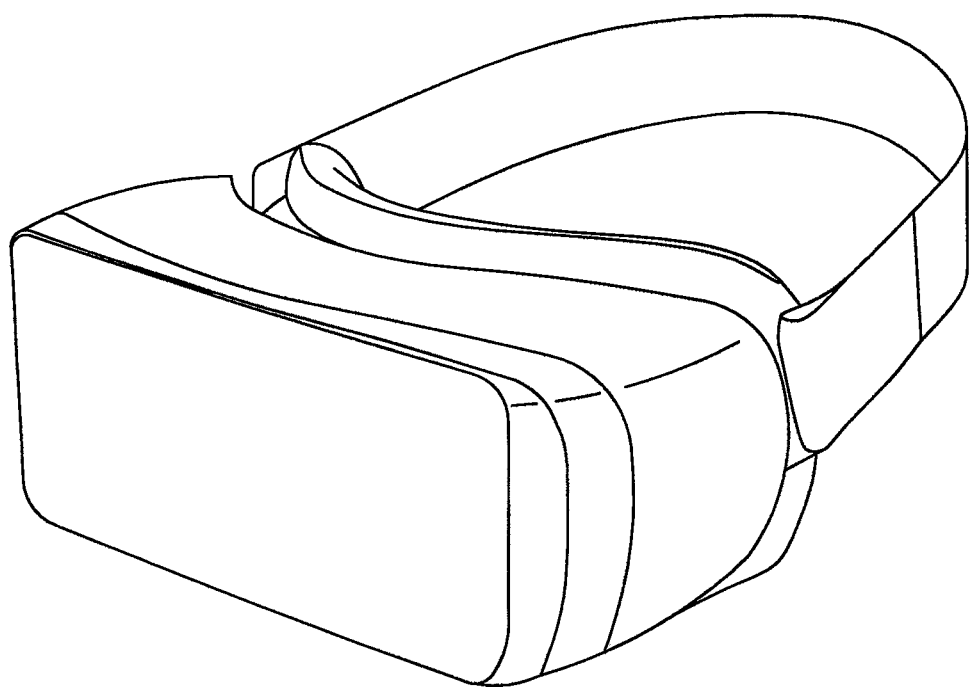
FIG. 10 is a diagram illustrating an example in which the electronic device of FIG. 9 is implemented as a head mounted display device.

FIG. 9 is a block diagram illustrating an electronic device according to embodiments, and FIG. 10 is a diagram illustrating an example in which the electronic device of FIG. 9 is implemented as a head mounted display device.

Referring to FIGS. 9 and 10, the electronic device 500 may include a processor 510, a memory device 520, a storage device 530, an input/output (I/O) device 540, a power supply 550, and a display device 560. Here, the display device 560 may be the display device 100 of FIG. 8. The electronic device 500 may further include a plurality of ports for communicating with a video card, a sound card, a memory card, a universal serial bus (USB) device, other electronic devices, etc. In an embodiment, as illustrated in FIG. 10, the electronic device 500 may be implemented as a head mounted display (HMD) device. However, the electronic device 500 is not limited thereto. For example, the electronic device 500 may be implemented as a computer monitor a laptop, a digital camera, a cellular phone, a smart pad, a smart watch, a tablet PC, an MP3 player, a car navigation system, a video phone, etc.

The processor 510 may perform various computing functions. The processor 510 may be a microprocessor a central processing unit (CPU), an application processor (AP), etc. The processor 510 may be coupled to other components via an address bus, a control bus, a data bus, etc. Further, the processor 510 may be coupled to an extended bus such as a peripheral component interconnection (PCI) bus. The memory device 520 may store data for operations of the electronic device 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 530 may include a solid state drive (SSD) device, a hard disk drive (HDD) device, a CD-ROM device, etc. The I/O device 540 may include an input device such as a keyboard, a keypad, a mouse device, a touchpad, a touch-screen, etc., and an output device such as a printer, a speaker, etc. In some embodiments, the display device 560 may be included in the I/O device 540. The power supply 550 may provide power for operations of the electronic device 500.

The display device 560 may be coupled to other components via the buses or other communication links. In some embodiments, the display device 560 may be an organic light emitting display device or a liquid crystal display device. However, the display device 560 is not limited thereto. As described above, the display device 560 may provide a high-quality image to a viewer (or user) by accurately compensating for non-uniform luminance of a display panel. To this end, the display device 560 may include the display panel, a display panel driving circuit, and a non-uniform luminance compensating circuit. The display panel may include first pixels located in a center region of the display panel and second pixels located in a non-center region of the display panel. The display panel driving circuit may drive the display panel. The non-uniform luminance compensating circuit may store compensation factors for the first pixels located in the center region of the display panel. In addition, the non-uniform luminance compensating circuit may calculate compensation factors for the second pixels located in the non-center region of the display panel by performing an interpolation between a reference compensation factor determined for an edge of the non-center region of the display panel and compensation factors for edge pixels located on an edge of the center region of the display panel among the first pixels located in the center region of the display panel when an displaying operation is performed on the display panel. Thus, the non-uniform luminance compensating circuit may compensate image data using the compensation factors for the first pixels and the compensation factors for the second pixels when the displaying operation is performed on the display panel. Because these are described above, duplicated description will not be repeated.

The present inventive concept may be applied to an electronic device including a display device. For example, the present inventive concept may be applied to a head mounted display device, a television, a computer monitor a laptop, a digital camera, a cellular phone, a smart phone, a smart pad, a smart watch, a tablet PC, an MP3 player, a car navigation system, a video phone, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims, with equivalents thereof to be included.

What is claimed is:

1. A method of compensating for non-uniform luminance of a display panel that comprises first pixels in a center region of the display panel and second pixels in a non-center region of the display panel comprising a first non-center region that is covered by perpendicular lines, which are perpendicular to an edge of the center region and respectively pass through points on the edge of the center region, and a second non-center region that is not covered by the perpendicular lines, the method comprising:
   displaying a for-compensation image on the display panel;
   generating a luminance image by capturing an image of an entire region of the display panel;
   extracting luminance values of the first pixels from the luminance image by analyzing the luminance image;
   calculating and storing compensation factors for the first pixels based on the luminance values of the first pixels;
   calculating compensation factors for the second pixels by performing an interpolation between a reference compensation factor determined for an edge of the non-center region and compensation factors for edge pixels among the first pixels on an edge of the center region when a displaying operation is performed on the display panel, the interpolation comprising a first interpolation that is performed on the first non-center region and a second interpolation that is performed on the second non-center region; and
   compensating image data using the compensation factors for the first pixels and the compensation factors for the second pixels when the displaying operation is performed on the display panel.

2. The method of claim 1, wherein the reference compensation factor is set to be 1.

3. The method of claim 1, wherein the interpolation is a linear interpolation.

4. The method of claim 3, wherein the edge of the center region has a circle shape or an ellipse shape.

5. The method of claim 4, wherein the interpolation is performed using a first point on the edge of the center region and a second point at which a perpendicular line, which is perpendicular to a tangent line that is tangential to the edge of the center region and passes through the first point, meets the edge of the non-center region.

6. The method of claim 3, wherein the edge of the center region has a tetragon shape.

7. The method of claim 1, wherein the first interpolation is performed using a first point on the edge of the center region and a second point at which a first perpendicular line of the perpendicular lines that passes through the first point meets the edge of the non-center region.

8. The method of claim 7, wherein the second interpolation is performed using a third point on the first perpendicular line and a fourth point at which a second perpendicular line, which is perpendicular to the first perpendicular line and passes through the third point, meets the edge of the non-center region.

9. A method of compensating for non-uniform luminance of a display panel that comprises first pixels in a center region of the display panel and second pixels in a non-center region of the display panel comprising a first non-center region that is covered by perpendicular lines, which are perpendicular to an edge of the center region and respectively pass through points on the edge of the center region, and a second non-center region that is not covered by the perpendicular lines, the method comprising:
   displaying a for-compensation image on the display panel;
   generating a luminance image by capturing an image of the center region;
   extracting luminance values of the first pixels from the luminance image by analyzing the luminance image;
   calculating and storing compensation factors for the first pixels based on the luminance values of the first pixels;
   calculating compensation factors for the second pixels by performing an interpolation between a reference compensation factor determined for an edge of the non-center region and compensation factors for edge pixels on an edge of the center region among the first pixels when a displaying operation is performed on the display panel, the interpolation comprising a first interpolation that is performed on the first non-center region and a second interpolation that is performed on the second non-center region; and
   compensating image data using the compensation factors for the first pixels and the compensation factors for the second pixels when the displaying operation is performed on the display panel.

10. The method of claim 9, wherein the reference compensation factor is set to be 1.

11. The method of claim 9, wherein the interpolation is a linear interpolation.

12. The method of claim 11, wherein the edge of the center region has a circle shape or an ellipse shape.

13. The method of claim 12, wherein the interpolation is performed using a first point on the edge of the center region and a second point at which a perpendicular line, which is perpendicular to a tangent line that is tangential to the edge and passes through the first point, meets the edge of the non-center region.

14. The method of claim 11, wherein the edge of the center region has a tetragon shape.

15. The method of claim 9, wherein the first interpolation is performed using a first point on the edge of the center region and a second point at which a first perpendicular line of the perpendicular lines, which passes through the first point, meets the edge of the non-center region.

16. The method of claim 15, wherein the second interpolation is performed using a third point on the first perpendicular line and a fourth point at which a second perpendicular line, which is perpendicular to the first perpendicular line and passes through the third point, meets the edge of the non-center region.

17. A display device comprising:
   a display panel comprising first pixels in a center region of the display panel and second pixels in a non-center region of the display panel comprising a first non-center region that is covered by perpendicular lines, which are perpendicular to an edge of the center region and respectively pass through points on the edge of the center region, and a second non-center region that is not covered by the perpendicular lines;
   a display panel driving circuit configured to drive the display panel; and
   a non-uniform luminance compensating circuit configured to:
   store compensation factors for the first pixels;

calculate compensation factors for the second pixels by performing an interpolation between a reference compensation factor determined for an edge of the non-center region and compensation factors for edge pixels on an edge of the center region among the first pixels when a displaying operation is performed on the display panel, the interpolation comprising a first interpolation that is performed on the first non-center region and a second interpolation that is performed on the second non-center region; and compensate image data using the compensation factors for the first pixels and the compensation factors for the second pixels when the displaying operation is performed on the display panel.

18. The device of claim 17, wherein the non-uniform luminance compensating circuit is implemented in the display panel driving circuit.

\* \* \* \* \*